United States Patent [19]

Kopetzky

[11] 4,443,669
[45] Apr. 17, 1984

[54] SUBSCRIBER CONNECTION CIRCUIT

[75] Inventor: Horst Kopetzky, Unterhaching, Fed. Rep. of Germany

[73] Assignee: Siemens Aktiengesellschaft, Berlin & Munich, Fed. Rep. of Germany

[21] Appl. No.: 292,505

[22] Filed: Aug. 13, 1981

[30] Foreign Application Priority Data

Sep. 29, 1980 [DE] Fed. Rep. of Germany ....... 3036686

[51] Int. Cl.$^3$ ............................................. H04M 3/22
[52] U.S. Cl. ......................... 179/175.2 C; 179/18 FA
[58] Field of Search .................. 179/175.2 C, 18 FA, 179/18 F, 16 EA

[56] References Cited

U.S. PATENT DOCUMENTS 4,132,864 1/1979 Feng ............................... 179/18 FA
4,320,260 3/1982 Lechner ......................... 179/18 FA Primary Examiner—A. D. Pellinen
Assistant Examiner—James L. Dwyer
Attorney, Agent, or Firm—Hill, Van Santen, Steadman & Simpson

[57] ABSTRACT

A subscriber connection circuit comprising an improvement for analyzing the reliability of operating states of a subscriber connection circuit without involving a substantial increase in cost over those used in known telecommunication systems which employ a central analyzing device for a plurality of subscriber connection lines. In the invention, the dialing state is monitored and loop interruptions due to dialing and clearance and of loop closure resulting from a call are monitored with subscriber individual analyzing devices which are each connected through separate voltage dividers R1 to R4 and R6 to R12 and by means of a plurality of feed resistors RS1 through RS7 and which are actuated depending upon the nature of the monitoring which is to be accomplished wherein the monitoring of the dialing state and of the loop interruption is accomplished using the same analyzing device and wherein switchover means from one type of monitoring to the other can be made by changing the divider ratio in the associated voltage dividers and their connection points to specific feed resistors. The voltage dividers and the feed resistors form a single structural unit that can be easily mounted at the subscriber connection point.

5 Claims, 1 Drawing Figure

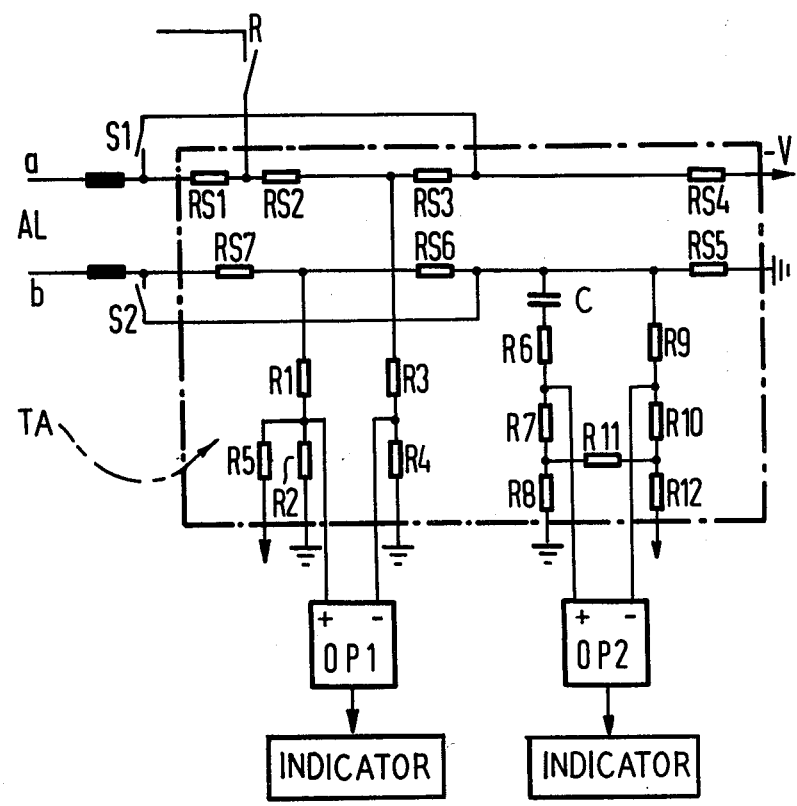

SUBSCRIBER CONNECTION CIRCUIT

BACKGROUND OF THE INVENTION

1. Field of the Invention

This invention relates in general to a subscriber connection circuit.

2. Description of the Prior Art

In known telephone systems, one central analyzing device which serves a plurality of subscriber connection lines is provided for the establishment of the operating states which are to be monitored of the subscriber loop line. Depending upon which type of operating state is to be monitored such analyzing device is connected by way of a special resistance matching network to the particular subscriber connection line which is to be monitored and the subscriber connection line is fed by way of a special feed resistors matched to the relevant form of monitoring. Although this solution is favorable from the point of view of circuitry outlay it can involve the occurrence of spurious pulses which reduce the analyzer's reliability both as a result of the operation of a multiplexer which connects the analyzing device to the individual subscriber connection line and also in the switch-over from one indication mode to another.

SUMMARY OF THE INVENTION

It is an object of the present invention to provide an improvement in analyzing reliability of the operating states of subscriber connection lines without increasing the cost over those used in prior art telecommunication systems.

In the invention, this objective is realized by using a subscriber connection circuit wherein during monitoring of the dialing state and interruptions in the subscriber loop as a result of dialing and clearance and for monitoring of the loop closure as a result of a call, an individual subscriber device is used for each subscriber and these are connected to the subscriber connection lines through separate voltage dividers. The voltage dividers comprise a number of feed resistors which serve to supply its feed voltage to the subscriber connection line and which are actuated according to the type of monitoring which is to be accomplished and wherein monitoring of the dialing state and the loop interruption occurs by the use of the same analyzing device and wherein in order to switch over from one type of monitoring to another a change is made in the divider ratio of the associated voltage dividers and their connection points to specific ones of the feed resistors and wherein the voltage dividers and the feed resistors form a unitary structural arrangement.

The subscriber-individual analyzing devices which are provided according to the invention and which are connected to the subscriber connection line by way of separate voltage dividers eliminates the need for the multiplexers provided in the prior art. The double use of the existing analyzing devices and certain of the feed resistors in the monitoring of the dialing state and of the subscriber loop interruptions caused by dialing and clearance assures that the additional cost resulting from the decentral arrangement and in particular where no other monitoring procedures are required results in no additional increase in monitoring cost. The fact that the voltage dividers form a unitary structural unit together with the feed resistors results in a uniform temperature characteristic and allows uniform adjustment of the resistors which makes it possible to obtain reliable analysis even with narrow analyzing tolerances.

According to a further development of the invention, the resistors structural unit can be constructed in the form of a thin film circuit.

According to a further development of the invention for monitoring of the subscriber loop closure due to a call two voltage dividers are provided which have the same divider ratio and are connected to the wire of the subscriber connection line which carries ground potential. One of such lines includes a capacitor arranged in series with the voltage divider resistors and a comparator is provided which receives two inputs that are connected to a divider point of another of the voltage dividers and are supplied with a bias voltage which is such that in the event of a call when the subscriber line loop is interrupted, one switching state is assumed and when the subscriber line loop is closed the other switching state is assumed so as to indicate these criteria. As a result of the connection of the comparator the same AC voltage component will exist at both of its ends. Thus, the ringing AC voltage is compensated relative to the analysis of the loop state. This is advantageous since the amplitude and phase state of the ringing AC voltage is dependent upon the length of the subscriber connection line and thus the superimposed ringing AC voltage could impair the analyzing reliability and in particular prevent high speed analysis.

Other objects features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWING

The FIGURE comprises an electrical schematic of the subscriber connection circuit of the invention.

DESCRIPTION OF THE PREFERRED EMBODIMENTS

The subscriber connection circuit of the invention is enclosed in dash dot line in the FIGURE and is connected to a subscriber station not shown by lines a and b.

Part of the contents of the subscriber connection circuit consists of battery supply and feed resistors such as resistors RS1 through RS7 with the resistors RS1 through RS4 connected in series between lines a and a negative voltage source minus V. The resistors RS5, RS6 and RS7 are connected in series between ground and line b as shown. The voltage minus V comprises the feed voltage. A first switch S1 and conductors abridge the series connected resistors RS1, RS2 and RS3 as shown. A second switch S2 and conductor is connected to bridge resistors RS6 and RS7. Thus, when the switches S1 and S2 are closed, the resistors RS4 and RS5 will serve as the feed resistors.

The monitoring of the dialing state or the question as to whether a connection request exists in the relevant subscriber station and the monitoring of the subscriber loop interruptions due to dialing and clearance is accomplished with a single analyzing device which is a comparator in the form of the operational amplifier OP1. The non-inverting input of the operational amplifier OP1 is connected to the connection point between resistors R1 and R2 which are connected in series between the junction point between resistors RS6 and resistor RS7 and ground. The resistors R1 and R2 form a voltage divider connected between a reference potential and the connection point of the resistors RS6 and RS7 which makes a connection between the feed battery and the b-wire of the subscriber connection line AL. An additional resistor R5 is connected to a feed battery potential and has its other side connected to the junction point between the resistors R1 and R2 and serves to appropriately bias the non-inverting input of the operational amplifier OP1 relative to an appropriate response threshold of the operational amplifier OP1. The inverting input of the operational amplifier OP1 is connected to the connection point between resistors R3 and R4 which are connected in series between ground and the junction point between resistors RS2 and RS3 and form a voltage divider which is connected between reference potential or ground and the connection point of the resistors RS2 and RS3 which establishes a connection to the feed battery and the a-wire of the subscriber connection line.

In order to monitor the subscriber loop closure as a result of a call a second comparator OP2 forming an operational amplifier is utilized. The first or non-inverting input of operational amplifier OP2 is from a junction point between resistors R6 and R7 which are connected in series with the resistor R8 between ground and one side of a capacitor C which has its other side connected to the junction point between resistors RS6 and RS5. The inverting input of operational amplifier OP2 is connected to the junction point between resistors R9 and R10 which are connected in series with the resistor R12 between the junction point between the resistors RS5 and RS6 and a feed battery bias voltage as illustrated. The voltage divider which is connected to the non-inverting input contains a capacitor C connected in series with the other voltage divider resistors. A resistor R11 is connected from the junction point of the resistors R7 and R8 and the resistors R10 and R12 so as to bias the voltage divider on the non-inverting input such that when the subscriber line loop is open it assumes one of two switching states and when it is closed it assumes the other switching state.

When the subscriber connection line AL is to be monitored for determining the dialing state the switches S1 and S2 are open as shown in the FIGURE. Due to the biasing of the operational amplifier OP1 and due to the selected corresponding divider ratio the operational amplifier OP1 will change its switching state when the hand set is lifted in the subscriber station (not shown) and as a result the subscriber line loop is closed. This transition from one switching state to the other is then utilized in a manner not explained in detail as an impulse to initiate procedures which establish the connection.

If on the other hand the subscriber line loop is to be monitored as a result of loop interruptions as the result of dialing and clearance, the switches S1 and S2 will be closed so that only the feed resistors RS4 and RS5 will be utilized as feed resistors. In this case, the resistors RS7 and RS1 and RS2 which are not used as feed resistors serve as a part of the voltage dividers from which the input voltages for the operational amplifier OP1 are tapped so that a different divider ratio prevails and as desired in the event of loop interruptions the operational amplifier changes from one switching state into another which is used in the monitoring criteria.

Also, when the loop closure is monitored as a result of a call, the switches S1 and S2 will be closed. In the event of a transition from an interrupted subscriber loop to a closed loop, the operational amplifier OP2 changes its switching state and causes an interruption in the ringing current which is fed through the switch contact R to the junction point between resistors RS1 and RS2 so that in this operating state of the subscriber line loop and additional to the feed current the ring current will also flow through the microphone of the subscriber station for only a short period of time. This is because if the ringing current were present for a longer period this could result in damage to the microphone.

As to whether the criteria is supplied by the operational amplifier OP2 will be analyzed depends upon the existence of a further criteria which occurs only during the ringing state since a change in the switching state of this operational amplifier can also occur in the event of changes in the loop state occurring during dialing.

The output of the operational amplifiers OP1 and OP2 can be supplied to suitable indicators as illustrated for indicating the conditions during the monitoring test.

The portion of the test circuit comprising the resistors RS1 through RS7 and R1 and R12 and including the capacitor C can be formed as a unitary structural unit and which can be preferably constructed as a thin film circuit.

Although the invention has been described with respect to preferred embodiments, it is not to be so limited as changes and modifications can be made which are within the full intended scope of the invention as defined by the appended claims.

I claim as my invention:

1. A circuit for a subscriber connection arrangement to subscriber lines (a, b) comprising first, second, third and fourth feed resistors connected in series between subscriber line a and a bias voltage, fifth, sixth and seventh feed resistors connected in series between subscriber line b and ground potential, a first switch means connected across said first, second and third feed resistors to short them out, a second switch means connected across said sixth and seventh feed resistors to short them out, first and second voltage divider resistors connected in series between the junction point between said sixth and seventh feed resistors and ground, a first operational amplifier with its non-inverting input connected to the junction point between said first and second voltage divider resistors, third and fourth voltage divider resistors connected in series between the junction point between said second and third feed resistors and ground, and output means connected to said first operational amplifier to monitor the dialing state when said first and second switch means are open.

2. A circuit according to claim 1 including a fifth voltage divider resistor connected between a bias voltage and the junction between said first and second voltage divider resistors.

3. A circuit according to claim 2 including a capacitor and sixth, seventh and eighth voltage divider resistors connected in series between the junction between said fifth and sixth feed resistors and ground, ninth, tenth and twelfth voltage divider resistors connected in series between the junction between said fifth and sixth feed resistors and a bias potential, an eleventh voltage divider resistor connected between the junction points between said seventh and eighth and said tenth and twelfth voltage divider resistors, and a second operational amplifier with its non-inverting input connected to the junction between said sixth and seventh voltage divider resistors and its inverting input connected to the junction between said ninth and tenth resistors to monitor subscriber loop closure when said first and second switch means are closed.

4. A circuit according to claim 3 including a second output means connected to said second operational amplifier.

5. A circuit according to claim 3 including a ringing switch connected to the junction between said first and second feed resistors.

* * * * *